United States Patent [19]

Bailly-Lacresse et al.

[11] 4,181,595
[45] Jan. 1, 1980

[54] PRODUCTION OF LUBRICANTS

[75] Inventors: Jean-Francois G. Bailly-Lacresse, St. Gratien; Albert Bonzom, Sausset les Pins; Jean C. Courtois, Reuil Malmaison, all of France

[73] Assignee: The British Petroleum Company Limited, Sunbury-on-Thames, England

[21] Appl. No.: 873,511

[22] Filed: Feb. 1, 1978

[30] Foreign Application Priority Data

Jan. 24, 1977 [FR] France ................. 77 01905

[51] Int. Cl.² ............................................. C10G 23/02
[52] U.S. Cl. ........................................ 208/18; 208/264
[58] Field of Search ......................... 208/18, 143, 264

[56] References Cited

U.S. PATENT DOCUMENTS

| 3,880,746 | 4/1975 | Bennett et al. | 208/18 |
| 3,902,988 | 9/1975 | Bennett et al. | 208/18 |

Primary Examiner—O. R. Vertiz
Assistant Examiner—Wayne A. Langel
Attorney, Agent, or Firm—Morgan, Finnegan, Pine, Foley & Lee

[57] ABSTRACT

The use of platinum on a largely $SiO_2$ catalyst for dearomatization of light lubricating oils. The catalyst can successfully process feedstocks with sulphur contents as high as 1000–3000 ppm.

10 Claims, 1 Drawing Figure

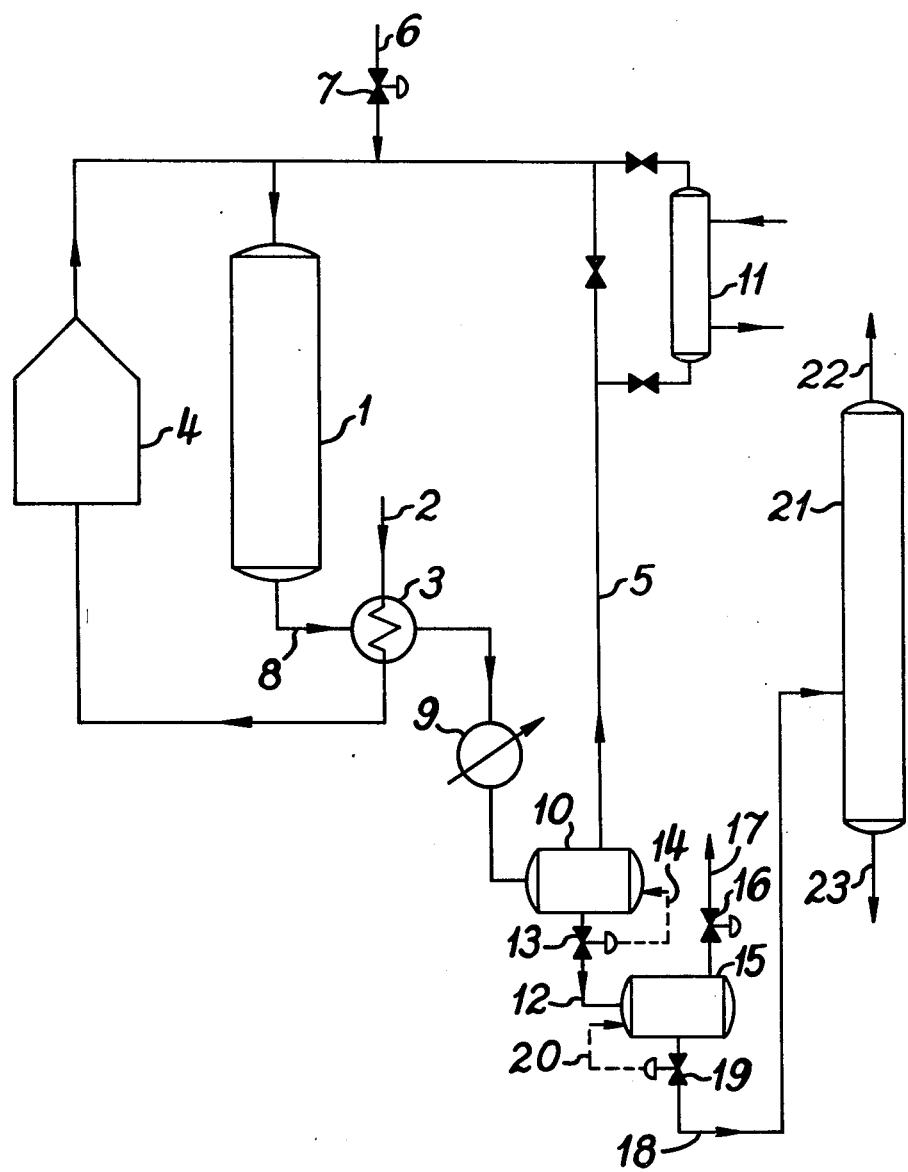

PRODUCTION OF LUBRICANTS

The present invention relates to a process for the production of lubricants with a low content of aromatics, known as BTA oils, obtained by the hydrogenation of petroleum fractions having a distillation end point greater than or equal to 350° C.

Industry currently uses hydrocarbon fractions as lubricants in the treatment of non-ferrous metals such as aluminium. These oils are particularly characterised by an initial distillation point such that the Pensky Martens flash point (standard AFNOR MO7-019) is higher than 100° to 140° C. for a distillation end point (standard AFNOR MO7-002) of the order of 300° to 450° C., a pour point (standard AFNOR T 60-105) ≦18° C. and a low viscosity (standard AFNOR T 60-100) of the order of 1 to 5 centistokes (cSt) at 50° C. These lubricants are generally obtained by the redistillation of gas oil fractions from the direct distillation of crude oils.

Although such lubricants can be obtained by a judicious choice of crude oil, the use of such oils is less and less permitted because of their high content of aromatic hydrocarbons. Some oils may contain more than 15 percent by weight of aromatics, whereas for health reasons the total content of aromatics should not exceed 5 percent by weight and furthermore their content of polycycloaromatic compounds, known as PCA, ought to be substantially zero. In practice, this means that the content of PCA in the lubricants should be sufficiently low to enable them to satisfy the test of the Food and Drug Administration (paragraph, 121. 1589 published on the 4th Mar. 1966; 31 FR 3.394) known as the PDA test. Passing this very severe test, based on the extraction of the PCA with dimethyl sulphoxide and the identification of their presence by spectrophotometric measurement of the absorbances in different wavelengths, permits the product to be brought into contact with foodstuffs.

The attempts at reducing the aromatic content of lubricants by choosing crude oils with a low aromatic content generally give rise to difficulties in obtaining the required characteristics of viscosity and pour point and it appeared to the Applicants that the hydrogenation of the aromatics should make it possible to obtain satisfactory lubricants.

Nevertheless, in the past, sufficient hydrogenation could not be obtained by a simple catalytic process, because of the presence of sulphur compounds.

It is well known that catalysts comprising metals of Group VIII deposited on to refractory supports, such as, for example, alumina, silica, zirconia, sepiolite, are generally excellent catalysts for the hydrogenation of aromatics, but their use in restricted by the poisoning of these catalysts by sulphur compounds. Thus catalysts on the basic of nickel are irreversibly and very rapidly poisoned by traces of sulphur products. On the other hand, platinum catalysts deposited on alumina are appreciably more resistant to sulphur. In particular, these catalysts can be used for the hydrogenation of light fractions containing small quantities of sulphur compounds. In practice, it appears that satisfactory hydrogenating activity can be obtained with hydrocarbon fractions having a distillation end point not exceeding approximately 250° C. and having a sulphur content not exceeding approximately 5 ppm.

A greater resistance to sulphur compounds may be imparted to platinum catalysts by using platinum catalysts deposited on alumina and treated with halogenated compounds either during preparation of the catalyst or during its use, or if platinum catalysts deposited on silica/alumina supports are used. Nevertheless, such highly acid catalysts do not permit satisfactory hydrogenation of light fractions containing more than 500 ppm of sulphur compounds.

We have now discovered that a catalyst comprising platinum deposited on a silica/alumina support permits the efficient hydrogenation of feedstocks having a distillation end point greater than or equal to 350° C., that is to say higher than that of fractions previously treated, and containing from 1,000 to 3,000 ppm by weight of sulphur.

The present invention therefore relates to a process for the manufacture of fluid lubricants with a low aromatic content, known as BTA oils, which process comprises hydrogenating a hydrocarbon fraction having a distillation end point higher than or equal to 350° C. and having a viscosity at 50° C. between 1 and 5 cSt and a pour point less than or equal to −18° C. and a sulphur content between 1,000 and 3,000 ppm by weight, over a catalyst comprising a noble metal of Group VIII, preferably platinum, deposited on a silica/alumina support containing a major proportion of silica, the support being produced in a manner known per se by calcining in air an intimate mixture of separately formed silica and alumina gel.

The catalyst preferably contains from 0.2 to 0.8 percent by weight of platinum deposited on a silica/alumina support containing from 50 to 90 percent by weight of silica. The support possesses Bronsted acid properties, which are particularly marked.

A mixture consisting of the feedstock and a gas rich in hydrogen is passed continuously over the catalyst in a fixed bed which may, after hydrogenation be separated in a known manner from the feedstock treated so as to be advantageously mixed again with feedstock. The space velocity is preferably between 0.2 and 6 (space velocity=volume of feedstock per hour and per volume of catalyst) at a reaction temperature of between 150° and 450° C., the pressure maintained by the make-up of gas rich in hydrogen being between 10 and 170 kg/cm$^2$ and the H$_2$/Hc ratio (rate of flow of hydrogen under normal conditions of temperature and pressure/rate of flow of hydrocarbons at 20° C.) being between 100 and 5,000. The hydrogenated feedstock is then topped by distillation so as to obtain lubricants having a Pensky Martens flash point higher than 120° C.

The lubricant obtained after hydrogenation and topping has a viscosity at 50° C. of between 1 and 5 cSt and preferably between 3 and 4 cSt, a pour point lower than or equal to minus 18° C. and its sulphur content is less than or equal to 160 ppm by weight.

The resulting lubricant has a total aromatic content less than or euqal to 5 percent by weight and a polycycloaromatic content which is substantially zero, which means that the BTA lubricant satisfies the FDA test mentioned above, and makes it safe to use this lubricant from the health point of view.

Since the hydrodesulphurisation accompanying the hydrogenation leads to the formation of appreciable quantities of sulphuretted hydrogen, it is advantageous to carry out a scrubbing of the recycling gases with a solution which eliminates sulphuretted hydrogen. This scrubbing results in an appreciable gain in the hydrogenating activity of the catalyst resulting from a decrease in the concentration of sulphur products at the level of the catalyst.

The feedstock containing from 1,000 to 3,000 ppm of sulphur may be easily obtained by the simple distillation of crude oils with a low sulphur content, such as for example those originating from Libyan, Saharan and North Sea deposits.

The feedstock containing from 1,000 to 3,000 ppm of sulphur may also be easily obtained by the hydrodesulphurisation of a petroleum fraction from the distillation of crude oils with a high sulphur content which is characterised by a distillation range which is more or less identical with that required for the process according to the Invention. It is well known that hydrodesulphurisation of petroleum fractions containing from 0.5 to 2.5 percent by weight of sulphur may be readily carried out over a catalyst containing cobalt and molybdenum compounds deposited on an alumina support.

The process according to the Invention is particularly advantageous because it does not require a feedstock with a very low sulphur content, which could only be obtained with great difficulty by a catalytic hydrodesulphurisation treatment, particularly because of the distillation range of the fraction which is characterised by an end point higher than or equal to 350° C.

The Invention is described by reference to the FIGURE in the accompanying Drawing.

The feedstock is obtained by the direct distillation of crude oil with a low sulphur content or by the hydrodesulphurisation of a direct distillation cut of crude oil with a high sulphur content.

It is introduced continuously into a reaction 1 through a line 2, its heating to the desired reaction temperature being carried out by means of a heat exchanger 3 and a furnace 4. Before being introduced into the reactor, the feedstock is continuously mixed with a gas rich in hydrogen so as to obtain the desired $H_2/Hc$ ratio. This gas rich in hydrogen comes both from recycle of the surplus of gas rich in hydrogen carried by a line 5 and a make-up of gas rich in hydrogen made necessary by the consumption of hydrogen due to the hydrogenation carried out, carried by a line 6 which also makes it possible by means of a pressure regulator 7 to maintain the pressure in the reactor at the desired reaction pressure. The mixture of the feedstock and of the gas rich in hydrogen passes by gravity over the catalyst contained in the reactor 1, and a line 8 makes it possible to with draw the products coming out of the reaction zone, which are then cooled by means of the heat exchanger 3 and a condenser 9. The products are then received into a separator 10 which permits the separation of a surplus gas rich in hydrogen which is mixed afresh with the feedstock through the line 5. In the process according to the Invention, a scrubbing column 11 for the recycled gases containing a solution which eliminates sulphuretted hydrogen produced during the hydrogenation treatment and limits the concentration of sulphur products in the reaction zone. The liquid contained in the separator 10, withdrawn through a line 12 via a valve 13 actuated by a level control 14 is then admitted into a second separator flask 15, the operating pressure of which is regulated by a valve 16 placed on a line 17 for the evacuation of the gases. The liquid withdrawn through a line 18 by means of a valve 19 actuated by a level control 20 is then distilled in a known manner in a column 21. The distillation makes it possible to withdraw at the top through a line 22 a light fraction and to withdraw at the bottom through a line 23 a BTA oil with the desired specifications, having an aromatic content less than 5 percent by weight and satisfying the FDA test.

The present Invention is illustrated by the examples which follow.

COMPARATIVE EXAMPLE

This example relates to the characteristics of two lubricants employed in industry. Their principal characteristics are shown in the table below:

|  |  | Oil No. 1 | Oil No. 2 |
|---|---|---|---|
| Density | 15° C. | 0.839 | 0.844 |
| ASTM Distillation |  |  |  |
| Initial point |  | 285 | 120 |
| 50% |  | — | — |
| End point |  | 316 | 400 |
| Sulphur | ppm by wt | — | — |
| Pour point | °C. | — | −11 |
| PM flash point | °C. | 150 | 124 |
| Viscosity at 50° C. | cSt | 1.50 | 3.53 |
| Aromatics | % by wt | 13.2 | 7 |
| FDA test |  | 2nd stage not satisfied | 2nd stage not satisfied |

As shown in the table above, the two oils of Prior Art, because of their aromatic content being too high cannot be used under satisfactory conditions of health. If oil No. 2, as a result of a judicious choice of raw materials, is found to be more satisfactory than oil No. 1, its aromatic content is nonetheless too high to satisfy the requirements of the users of BTA fluid lubricants.

As the two oils do not satisfy the FDA test, the result is also that their polycycloaromatic content may be regarded as dangerous.

The FDA test consists in principle in subjecting the oil to an extraction by a mixture of dimethylsulphoxide and phosphoric acid and measuring the absorbance in ultra violet of the extracted product. The table below shows the absorbance limit which enables one to consider that the oil satisfies the FDA test.

| Wavelengths $M\mu$ | Maximum Absorbance per cm of Optical Path |
|---|---|
| 280–289 | 0.7 |
| 290–299 | 0.6 |
| 300–359 | 0.4 |
| 360–400 | 0.09 |

If at the first stage the absorbance limits are exceeded, the extract is then percolated through a chromatographic column consisting of a mixture of magnesium oxide and Celite 545. The polycycloaromatic compounds are then eluted from the column by an acetone/benzene/water mixture. If at this second stage the eluted product satisfies the absorbance limits shown above, the oil is then considered as satisfying the FDA test.

EXAMPLE 1

Example 1 relates to the process according to the Invention.

The feedstock is obtained by the hydrodesulphurisation of a petroleum fraction coming from the distillation of crude oils with a high sulphur content, over a catalyst consisting of oxides of cobalt and molybdenum on an alumina support.

The feedstock has an end distillation point of 358° C. and a sulphur content of 1,600 ppm by weight. Other characteristics of the feedstock are shown in Table 1 below.

The feedstock is hydrogenated under different operating conditions as shown in Table 1 below, over a catalyst consisting of 0.55 percent by weight of platinum deposited on a commercial silica/alumina support containing 86 percent by weight of silica and usually employed, because of its high acidity, as a catalyst in catalytic cracking units.

The hydrogenated feedstock is then topped by distillation to give the BTA lubricants whose characteristics are set out in Table 1 below.

TABLE 1

|  |  | Feed-stock | Oil No.3 | Oil No.4 | Oil No.5 |
|---|---|---|---|---|---|
| Operating Conditions |  |  |  |  |  |
| Vol/vol/hr (Volume of feed-Stock per volume of catalyst and per hour) |  |  | 1 | 1 | 1 |
| Pressure | kg/cm$^3$ |  | 120 | 120 | 70 |
| Temperature | °C. |  | 350 | 350 | 350 |
| Rate of flow of hydrogen/rate of flow of hydrocarbons (H$_2$/Hc) |  |  | 2,000 | 2,000 | 2,000 |
| Scrubbing of recycled gas (10% by weight solution of NaOH) |  |  | No | Yes | Yes |
| Characteristics of the Feedstock or of the Topped Oil |  |  |  |  |  |
| Density (15° C.) |  | 0.838 | 0.823 | 0.823$^4$ | 0.825 |
| Sulphur | ppm by wt | 1600 | 120 | 70 | 40 |
| Characteristics of the Feedstock or of the Topped Oil |  |  |  |  |  |
| ASTM Distillation |  |  |  |  |  |
| Initial point |  | 236 | 112 | 143 | 159 |
| 5% |  | 243 | 188 | 194 | 228 |
| 10% |  | 253 | 228 | 228 | 238 |
| 30% |  | 270 | 260 | 260 | 262 |
| 50% |  | 284 | 278 | 276 | 278 |
| 70% |  | 304 | 296 | 296 | 298 |
| 90% |  | 331 | 327 | 325 | 329 |
| 95% |  | 341 | 338 | 337 | 341 |
| End point |  | 358 | 352 | 353 | 351 |
| Pour point | °C. | −7 | −5 | −7 | −5 |
| PM flash point | °C. | 120 | 143 | 130 | 137 |
| Viscosity at 50° C. | cSt | 2.9 | 3.7 | 3.4 | 3.7 |
| Aromatics | % by wt | 23.2 | 2.9 | 0.7 | 2.0 |
| FDA Test |  |  |  |  |  |
| 1st stage |  |  | * | * | ** | ** |
| 2nd stage |  |  | * | ** |  |  |

*Not satisfied
**Satisfied

It can be seen from the above table that the hydrogenation over a platinum catalyst deposited on a silica/alumina support of a feedstock characterised by a high end point and an appreciable sulphur content makes it possible to obtain lubricants which are noteworthy because of the fact that they have an aromatic content which is considerably less than 5 percent by weight and in that they satisfy as well the FDA test.

It can also be seen from this table that the scrubbing of the recycling gases makes it possible, under equal reaction conditions, to bring about a noteworthy reduction in the aromatic content of the oil (oil No. 4) or an appreciable reduction of the reaction pressure (oil No. 5).

We claim:

1. Process for the manufacture of lubricants having viscosity at 50° C. between 1 and 5 cSt, and pour point less than or equal to −18°, and a total aromatic content which is less than or equal to 5 percent by weight and a content of polycycloaromatic compounds which is substantially zero, showing it-self in the fact that it satisfies the FDA test, said process being characterised by the fact that it comprises hydrogenating a hydrocarbon fraction having a distillation end point higher than or equal to 350° C. and having a sulphur content between 1,000 and 3,000 ppm over a catalyst consisting of platinum deposited on a silica/alumina support containing greater than 50% by weight of silica, the support being prepared by calcining in air an intimate mixture of separately produced silica gel and alumina gel.

2. Process in accordance with claim 1, characterised by the fact that the catalyst contains from 0.2 to 0.8 percent by weight of platinum deposited on a silica/alumina support containing from 50 to 90 percent by weight of silica.

3. Process in accordance with claims 1 or 2, characterised by the fact that a space velocity of between 0.2 and 6, and a reaction temperature of between 150° and 450° C. are employed, the pressure being maintained by the make-up of gas rich in hydrogen between 10 and 170 kg/cm$^2$ and the H$_2$/Hc ratio (rate of flow of hydrogen under normal conditions of temperature and pressure/rate of flow of hydrocarbons at 20° C.) being between 100 and 5,000.

4. Process in accordance with claim 3 characterised by the fact that the said hydrocarbon fraction is obtained by the simple distillation of crude oils with a low sulphur content.

5. Process in accordance with claims 1 or 2, characterised by the fact that the hydrocarbon fraction is obtained by the hydrodesulphurisation of a petroleum fraction from the distillation of crude oils with a high sulphur content over a catalyst containing cobalt and molybdenum compounds deposited on an alumina support.

6. Process in accordance with any of claims 1 or 4, characterised by the fact that before being reintroduced into the hydrogenation reactor, the recycled gases are scrubbed.

7. Process in accordance with any of claims 1 or 2 characterised by the fact that the hydrogenated hydrocarbon fraction is then topped by distillation so as to obtain lubricants having a Pensky Martens flash point higher than 120° C.

8. Lubricant obtained by the process according to any of claims 1 or 2, characterised by the fact that it has a viscosity a 50° C. of between 1 and 5 cSt, a pour point lower than or equal to minus 18° C., a total aromatic content which is less than or equal to 5 percent by weight and a content of polycycloaromatic compounds which is substantially zero, showing itself in the fact that it satisfies the FDA test.

9. Lubricant according to claim 8 wherein the viscosity is between 3 and 4 cSt.

10. Lubricant according to claim 8 further characterised by the fact that it has a sulphur content which is lower than or equal to 160 ppm by weight.

* * * * *